W PAINTER.

BOTTLE STOPPER.

(Application filed Dec. 26, 1896.)

No. 11,685. Reissued July 26, 1898.

Attest
Walter Malason
F. L. Middleton

Inventor
Wm. Painter
by Geo. Spear
Atty.

THE NORRIS PETERS CO., PHOTO-LITHO., WASHINGTON, D. C.

UNITED STATES PATENT OFFICE.

WILLIAM PAINTER, OF BALTIMORE, MARYLAND, ASSIGNOR TO THE CROWN CORK AND SEAL COMPANY, OF SAME PLACE.

BOTTLE-STOPPER.

SPECIFICATION forming part of Reissued Letters Patent No. 11,685, dated July 26, 1898.

Original No. 540,072, dated May 28, 1895. Application for reissue filed December 26, 1895. Serial No. 573,419.

*To all whom it may concern:*

Be it known that I, WILLIAM PAINTER, of Baltimore, in the State of Maryland, have invented new and useful Improvements in Stoppers for Bottles or other Vessels; and I declare that the following is a full and accurate description of the invention.

Bottle-stoppers which act by expansion have heretofore been made; but so far as I am aware they have always been composed of elastic material, expanded and maintained in that condition by a sustained mechanical pressure. This requires the presence of mechanism with each stopper whereby the required pressure may be produced and maintained. My invention differs from these in the employment of an expanding stopper made of some material substantially inelastic which when once expanded within the bottle-mouth will remain so.

Figure 1:
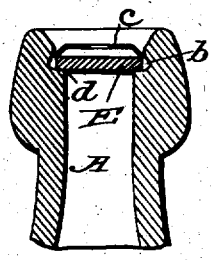
Figure 2:
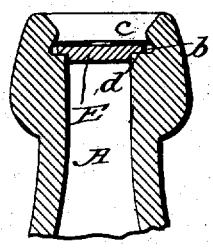
Figure 3:
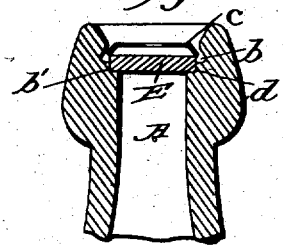
Figure 4:
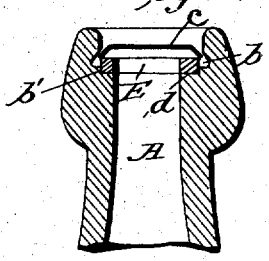
Figure 5:
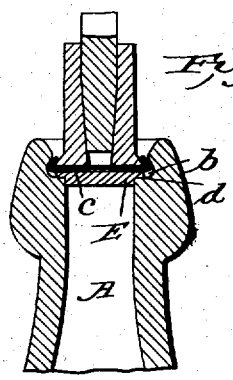
Figure 6:
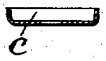

In the accompanying drawings, Figure 1 is a central section of a bottle-neck having a groove and a packing in said groove and showing my stopper in position to be expanded. Fig. 2 is a similar section showing the same expanded and with the packing in the groove compressed and clamped against the adjacent surface of the groove. Figs. 3, 4, 5, and 6 are modifications—*i. e.*, Fig. 3 differs from Fig. 1 only in the form of the bottle-groove at its lower surface. Fig. 4 illustrates an annular or ring shaped packing and a disk adapted to coöperate with it, said disk having no hole in it like the disk of Figs. 1, 2, and 3. Fig. 5 illustrates a bottle and a packing similar to those shown in Fig. 1, but with a bottle-groove of different shape and a cup-shaped disk reversed from the position shown in Fig. 1 and with means for expanding the disk. Fig. 6 illustrates such a cup-shaped disk as is shown expanded in Fig. 5, its edge or side being more squarely turned than is the case with the disks shown in Figs. 1, 3, and 4.

A is the bottle-neck, provided interiorly with a groove *b*. In Figs. 1 and 2 this groove is somewhat angular, but in Fig. 5 it is rounded, and in Figs. 3 and 4 its lower side is L-shaped in cross-section, as at *b'*.

C is a cup-shaped disk of malleable metal, commercial tin or other substantially inelastic metallic material being suitable. The circumferential diameter of the disk C is slightly less than the interior diameter of the bottle-neck above the groove *b*, so that it will slip freely through and rest upon the shoulder *d*, which projects inward slightly farther than that portion of the bottle-neck above the groove. The disk C, as shown in Figs. 1, 3, and 4, is introduced concave side downward and convex side outward, so that its edge rests all around on said shoulder *d* and is free to expand into said groove when sufficient pressure is applied to the convex side to permanently reduce the convexity. Sufficient pressure will suppress the convexity and produce a plane; but the relative dimensions preferred are such that the edge of said disk will reach the bottom of said groove before the convex figure has disappeared, and in that way a hard and tight contact all around may be produced; but as it is practically impossible to produce disks or bottle-necks perfectly circular it is desirable to employ a packing E of some kind with the disk C. This packing may be in the form of a gasket laid in said groove around the edge of the disk or beneath the same and between it and the shoulder *d*; but I prefer to employ a disk of the packing material laid below the disk C and either clamped against the shoulder *d* or forced into the bottle-throat below said shoulder and retained there by the disk. Material for the packing may be india-rubber, cork, or other suitable material, many of which are well known in the art.

For convenience in extracting a small hole may be made in the middle of the disk C, as shown in Figs. 1, 2, 3, 5, and 6, for the insertion of a tool whereby said disk may be pulled out.

It is apparent that this stopper is applicable to vessels other than bottles, such as jars, kegs, barrels, &c.

The characteristic of the material from which I form the disk or plate is that it possesses permanent flexion—that is to say, it retains the form into which it may be bent or flattened or partially flattened. By the words "primarily-concave side" as hereinafter used I intend that side of the disk which is concave before the disk has been forced into its final position, although when in the latter position the original or primary concave form may have been lost, as shown in Fig. 2, by the flattening of the disk.

Having described my invention, I claim—

1. The combination of a receptacle having a groove in the inside of its mouth and a shoulder projecting inward beyond the wall of the mouth above the groove, and a cup-shaped disk or plate of material having permanent flexion, all operating as set forth.

2. The combination of a receptacle having a groove in the inside of its mouth and a shoulder projecting inward beyond the wall of the mouth above the groove, and a cup-shaped disk or plate of material having permanent flexion and formed with a hole, all operating as set forth.

3. The combination of a receptacle having a groove in the inside of its mouth and a shoulder projecting inward beyond the wall of the mouth above the groove, and a cup-shaped disk or plate of material having permanent flexion arranged with its primarily-concave side downward, all operating as set forth.

4. The combination of a receptacle having a groove in the inside of its mouth and a shoulder projecting inward beyond the wall of the mouth of the groove, a cup-shaped disk or plate of material having permanent flexion, and a packing or stopper beneath and retained by the disk or plate, all operating as set forth.

5. The combination substantially as hereinbefore described, of a bottle having an interior groove in its mouth, a packing or gasket in said groove and a disk or plate of material having permanent flexion, which confines the packing in said groove, and maintains it in tight contact with the adjacent surface of the groove.

WILLIAM PAINTER.

Witnesses:
WALLACE ROBB,
C. E. TEALE.